United States Patent [19]

Inoue et al.

[11] Patent Number: 5,354,489

[45] Date of Patent: Oct. 11, 1994

[54] METHOD FOR CHANGING THE VISCOSITY OF A FLUID COMPRISING A LIQUID CRYSTAL COMPOUND

[75] Inventors: Akio Inoue; Syunji Maniwa, both of Shizuoka, Japan

[73] Assignee: Asahi Kasei Kogyo Kabushiki Kaisha, Osaka, Japan

[21] Appl. No.: 751,052

[22] Filed: Aug. 28, 1991

[30] Foreign Application Priority Data

Aug. 30, 1990 [JP] Japan .................................. 2-226653
Feb. 20, 1991 [JP] Japan .................................. 3-026283
Feb. 21, 1991 [JP] Japan .................................. 3-027371

[51] Int. Cl.$^5$ .................... C10M 171/00; C09K 19/00
[52] U.S. Cl. ........................ 252/73; 252/77; 252/78.3; 252/79; 252/299.01; 252/299.67; 361/225
[58] Field of Search ............ 252/299.67, 299.01, 252/78.3, 77, 79, 73; 528/15, 26; 361/225

[56] References Cited

U.S. PATENT DOCUMENTS

| | | | |
|---|---|---|---|
| 4,388,453 | 6/1983 | Finkelmann et al. | 252/299.01 |
| 4,904,066 | 2/1990 | Gray et al. | 252/299.01 |
| 4,950,726 | 8/1990 | Yoshioka et al. | 528/15 |
| 4,981,607 | 1/1991 | Okawa et al. | 252/299.01 |
| 4,983,318 | 1/1991 | Matsumoto et al. | 252/299.01 |

FOREIGN PATENT DOCUMENTS

| | | |
|---|---|---|
| 0291338 | 11/1988 | European Pat. Off. . |
| 2-127494 | 5/1990 | Japan . |
| 2-193115 | 7/1990 | Japan . |
| 2208515A | 5/1989 | United Kingdom . |

OTHER PUBLICATIONS

Proceedings of the Second International Conference on Er Fluids, Aug. 7-9, 1989, pp. 231-251.
Japanese Journal of Applied Physics, vol. 16, No. 10, pp. 1775-1783.
J. J. Wysocki et al., Communications, "Electroviscosity of a Cholesteric Liquid-Crystal Mixture," pp. 3865-3866.
Japanese Journal of Applied Physics, vol. 17, No. 9, pp. 1525-1530.
Dai-39-kai Kobunshi Toronkai Yokosyu, 18U07 (1990) (Polymer Preprints Japan, Vo. 39, No. 11).
Dai-16-kai Ekisyo Toronkai Koen Yokosyu, 1K216 (1990).
H. Ringsdorf et al., "Liquid Crystalline Side Chain Polymers with Low Glass Transition Temperatures," *Makromol. Chem., Rapid Commun.*, 3, 557-562 (1982).
Japanese Journal of Applied Physics, vol. 18, No. 5, Jan. 1979, pp. 1015-1016.
Transfaraday Soc., vol. 52, 1955, pp. 571-591, "Liquid-Crystalline Structures in Solutions of a Polypeptide".
Finklemann, "Synthesis Structure and Properties of Liquid Crystalline Side Chain Polymers", Polymer Liquid Crystals, 1982, Academic Press, pp. 35-63.

*Primary Examiner*—Christine Skane
*Attorney, Agent, or Firm*—Finnegan, Henderson, Farabow, Garrett & Dunner

[57] ABSTRACT

A homogeneous electrorheological fluid is disclosed, which mainly comprises a liquid crystal compound in which a plurality of liquid crystal groups are bonded to a molecular chain either directly or via a spacer, or comprises a lyotropic liquid crystal comprising a solute and a solvent. The electrorheological fluid exhibits higher electrorheological effects as well as high response rate and low power driving properties while being free from sedimentation or flocculation.

18 Claims, 3 Drawing Sheets

METHOD FOR CHANGING THE VISCOSITY OF A FLUID COMPRISING A LIQUID CRYSTAL COMPOUND

FIELD OF THE INVENTION

This invention relates to a homogeneous electrorheological fluid which is useful as an actuator for vibration absorption, torque transmission, servo control systems, etc.

BACKGROUND OF THE INVENTION

An electrorheolgical fluid whose viscosity greatly, instantaneously, and reversibly changes on voltage application has been well known since the 1940's as a so-called Winslow fluid, comprising an insulating oil having dispersed therein water-containing fine particles, such as silica and starch (see U.S. Pat. No. 2,417,850).

Since then, many improvements on electrorheological fluids have hitherto been proposed. For example, it has been proposed to use, as water-containing fine particles, ion exchange resin particles (see JP-A-50-92278, the term "JP-A" as used herein means an "unexamined published Japanese patent application") or zeolite particles (see JP-A-2-3711), or to use non-water-containing particles, such as organic semi-conductor particles (see British Patent 2,170,510), conductor particles having the surfaces thereof rendered insulating (see JP-A-64-6093), and liquid crystal polymer particles (see *Proceedings of the 2nd Int'l Conf. on ERF*, p. 231 (1989)). These electrorheological liquids containing fine particles exhibit excellent performance properties for a short period of time but unavoidably undergo sedimentation and flocculation of dispersed particles and become muddy with the passage of time. They have thus not seen practical use.

On the other hand, homogeneous liquids containing no particles which are now under study include polar liquids, e.g., nitromethane and nitrobenzene (see *Japan J. Appl. Phys.*, Vol. 16, p. 1775 (1977)), cholesteric liquid crystal mixtures (see *Communication*, p. 3865 (1965)), low-molecular liquid crystals, e.g., methoxybenzylidenebutylaniline (MBBA) (see *Japan J. Appl. Phys.*, 171525 (1978) and British Patent 2208515A), and ferroelectric polymer solutions (see *Dai 39-kai Kobunski Toronkar Yokosyu*, 18U07 (1990)). However, these liquids reveal no substantial electrorheological effect.

Furthermore, for operation these conventional electrorheolgical fluids require the application of high voltages of 2 to 3 kv/mm. Such electrotheological fluids are limited to use at low temperatures since current value increases rapidly at high temperatures.

Liquid crystals undergo molecular orientation when a voltage is applied to them to cause anisotropy in various characteristics. For example, a change in elasticity has been reported, with respect to a lyotropic liquid crystal with a voltage applied thereto (see *Dai 16-kai Ekisyo Toronkai Koen Yokosyu*, 1K216 (1990)).

Liquid crystals have therefore been contemplated for use as electrorheological fluids, but little importance has attached thereto due to the smallness of viscosity increase observed.

SUMMARY OF THE INVENTION

The present invention has been made in view of the above circumstances and has as an object to provide a liquid crystal type homogeneous electrorheological fluid which shows a great change of viscosity upon the application of voltage while retaining excellent characteristics of liquid crystal materials, i.e., high rate of response (or short response time) and low power driving properties, and being free from the problem of sedimentation or flocculation.

All the liquid crystal materials conventionally studied to date are low-molecular weight liquid crystals per se which show no great increase of viscosity on molecular orientation by the application of voltage. The instant inventors considered that such low-molecular weight liquid crystals have a small bonding strength among orientated molecules (domains) so that the viscosity does not greatly increase as a whole. Hence, the present inventors have conducted extensive investigations based on the assumption that the bonding strength between orientated domains would be increased, leading to a considerable viscosity increase, by bonding a liquid crystal to a molecular chain of moderate length or by polymerizing the liquid crystal. As a result, it has now been found that a liquid crystal compound in which a plurality of liquid crystal groups are bonded to a molecular chain or a lyotropic liquid crystal in which a certain kind of a solute is combined with a solvent in a certain concentration to exhibit liquid crystal properties produces extremely great electrorheological effects. The present invention is based on this finding.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the homogeneous electrorheological fluid of the present invention comprises a liquid crystal compound comprising a molecular chain having at least two liquid crystal groups bonded thereto either directly or via a spacer, or comprising a lyotropic liquid crystal comprising a solute and a solvent.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings, FIGS. 1-(a) through (e) are schematic views of a typical molecular structure of the liquid crystal compounds according to the present invention.

DETAILED DESCRIPTION OF THE INVENTION

The present invention relates to a homogeneous electrorheological fluid mainly comprising a liquid crystal compound in which a plurality of liquid crystal groups are bonded to a molecular chain either-directly or via a spacer and also to a homogeneous electrorheological fluid comprising a lyotropic liquid crystal.

The Liquid Crystal Compounds

Figure 1A:
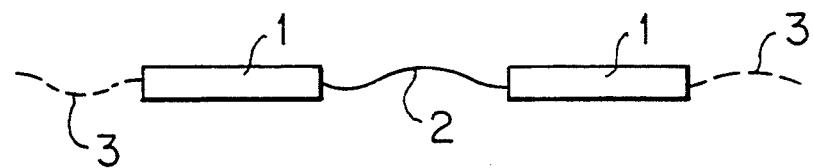
Figure 1B:
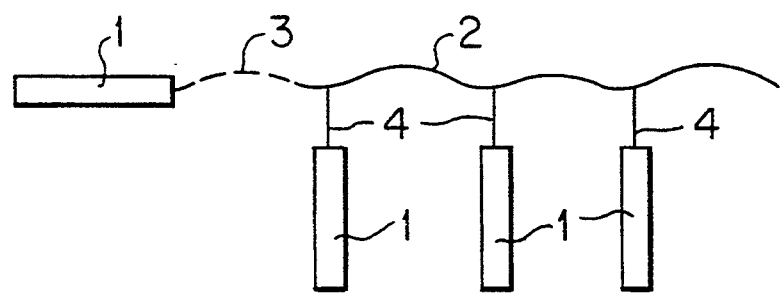
Figure 1C:
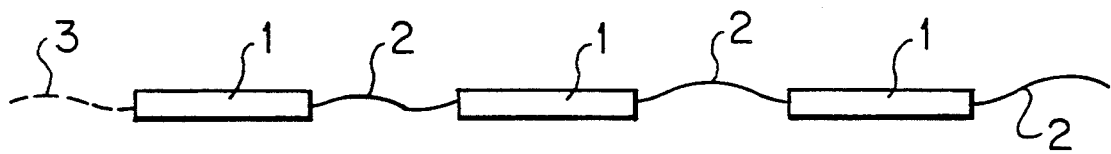
Figure 1D:
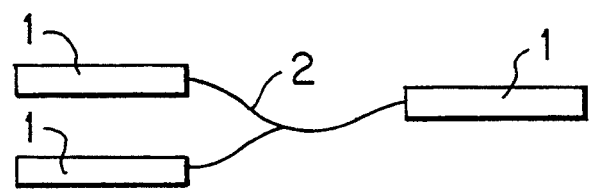
Figure 1E:
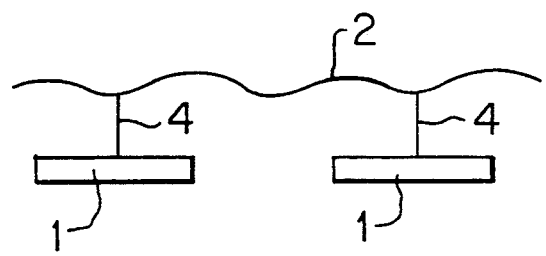

In accordance with the present invention the liquid crystal compound in which a plurality of liquid crystal groups are bonded to a molecular chain may be any of: (i) a side chain type liquid crystal compound in which liquid crystal groups (1) are pendant from a molecular chain (2) either directly or via a spacer (4) as shown in FIGS. 1(b) and (e); (ii) a main chain type liquid crystal compound in which liquid crystal groups (1) are incorporated into the main chain of a molecular chain (2) to have such a structure as (liquid crystal group)-(molecular chain)-(liquid crystal group) - - - as shown in FIGS. 1(a) and (c); and (iii) a composite type liquid crystal compound in which a liquid crystal group (1) or a molecular chain (2) of the main chain type liquid crystal compound has further bonded thereto a liquid crystal group (1) as shown in FIG. 1(d).

Even a liquid crystal compound having two liquid crystal groups bonded to a molecular chain, for example, a liquid crystal group-terminated compound in which a liquid crystal group is bonded to each terminal of a molecular chain, also shows remarkable electrorheological effects on voltage application without dependance on molecular weight, although a liquid crystal compound having one liquid crystal group shows little electrorheological effects.

The terminology "molecular chain" as used herein means monomers having, as a unit, a molecule of a chain compound mainly comprising carbon or silicon, such as an alkylene and a siloxane, or of a cyclic compound, such as benzene ring and glucose ring, and a homo- or copolymers of these monomers. The homo- or copolymers have a degree of polymerization of from 2 to 100, and preferably from 2 to 30.

The molecular chain must have at least two bonding groups capable of chemically bonding to a liquid crystal group or a spacer, at one or both terminals or side chains thereof. Examples of the bonding group include an alkylene with 1 to 18 carbon atoms, an amido, an urethane, an ester, an ether and a carbonate.

If desired, the molecular chain may contain therein a bonding group, e.g., an ester, an amido, and a phenylene.

A preferable molecular chain is a flexible molecular chain. The terminology "flexible molecular chain" as used herein means a soft molecular chain which exhibits fluidity even at relatively low temperatures and which does not interfere with orientation of liquid crystal molecules upon the application of voltage. Preferred is such a flexible molecular chain of the type for which an oligomer or polymer produced using a unit of the flexible molecular chain has a glass transition temperature (Tg) not higher than room temperature (about 25° C.), more preferably not higher than 0° C., and further preferably not higher than −20° C. More specifically, the flexible molecular chain includes monomers having, as a unit, (i) an alkylene group of formula $-C_mH_{2m}-$, wherein m is an integer of from 1 to 18 (e.g., methylene, ethylene, propylene), (ii) an oxyalkylene group of formula $-OC_mH_{2m}-$ (wherein m is an integer of from 1 to 5) (e.g., oxyethylene, oxypropylene, oxybutylene), or (iii) a siloxane group of formula $-SiR^1R^2O-$ (wherein $R^1$ and $R^2$ each represent an alkyl group or a phenyl group) (e.g., dimethylsiloxane, phenylmethylsiloxane), etc.; and homo- or copolymers of these monomers. In the case of homo- or copolymers thereof, particularly preferable degree of polymerization is from 2 to 10 in the unit (i) or (ii) above and 2 to 30 in the unit (iii) above.

Of the units constituting the flexible molecular chain, a siloxane or alkylene skeleton is preferred for manifestation of electrical characteristics and liquid crystal properties. In particular, since a flexible molecular chain comprising a siloxane skeleton has a Tg of about −123° C. and is therefore superior to an alkylene or oxyalkylene skeleton in softness in low temperatures, it easily exhibits liquid crystal properties from a relatively low temperature when combined with a plurality of liquid crystal groups and easily forms a liquid crystal compound having a low basic viscosity.

In the molecular chain, a portion of the hydrogen atoms bonded to a carbon atom and of the $R^1$ and $R^2$ groups bonded to a silicon atom may be displaced with a bonding group of the type referred to above or a side chain group such as an alkyl group with 1 to 8 carbon atoms and a phenyl group.

The flexible molecular chain may have a given length or may have a broad molecular weight distribution, for example, a degree of molecular weight distribution (Mw/Mn, wherein Mw means weight average molecular weight and Mn means number average molecular weight) of 2 or more. The molecular chains may be crosslinked to some extent, but it is preferable that they have no crosslinked structure because crosslinking appears to interfere with orientation of liquid crystal molecules on voltage application.

Liquid crystal groups to be bonded to the molecular chain are univalent or bivalent groups containing a central molecular structure bearing on manifestation of liquid crystal properties (so-called mesogen) of known low-molecular liquid crystals, such as Schiff base compounds, azo compounds, azoxy compounds, biphenyl compounds, terphenyl compounds, benzoic ester compounds, cyclohexylcarboxylic acid ester compounds, phenylcyclohexane compounds, biphenylcyclohexane compounds, and cholesteryl compounds. For details and typical examples of such central molecular structures, reference can be made to Christopher K. Ober et al, *Advances in Polymer Science* 59, 103-120, Springer-Verlag (1984) and Shoichi Matsumoto, *Ekisyo Erekutoronikusu*, Ohmu K. K., etc. Of these liquid crystal groups, those exhibiting a liquid crystal phase having a large positive dielectric anisotropy (2 or larger, more preferably 5 or larger, still more- preferably 10 or larger) and those exhibiting a smectic liquid crystal phase are preferred for obtaining high electrorheological effects and a high rate of response at a low applied voltage. A smectic liquid crystal phase may be exhibited by combining two different kinds of nematic liquid crystal groups, such as one group showing positive dielectric anisotropy with the other group showing negative dielectric anisotropy.

2 to 100 liquid crystal groups may be bonded to one molecular chain depending upon the length of the molecular chain. It is preferred that the number of the liquid crystal groups to be bonded to one molecular chain is 10 to 50% of the number of units in the molecular chain.

The liquid crystal groups are, in some cases directly bonded to the bonding groups of a molecular chain, but, usually, they are bonded to the bonding groups via a bivalent molecule known as a spacer, such as $-C_mH_{2m}-$ and $-(SiR^3R_4O)_m-$ (wherein m is an integer of from 1 to 18, and $R^3$ and $R^4$ each represent an alkyl group of $C_1$ to $C_5$, e.g., methyl and ethyl), so as to facilitate movement or orientation of the liquid crystal groups. The length of such a spacer not only affects many characteristics of the resulting liquid crystal compound, such as liquid crystal phase type, phase transition temperature, and rate of response, but also influences the electrorheological effects. For example, where a liquid crystal group of a benzoic ester liquid crystal compound is introduced to a molecular chain comprising a siloxane unit via a $-C_mH_2m-$ group as a spacer, the resulting compound exhibits a nematic phase when m is 3, or it exhibits a smectic phase and produces great electrorheological effects when m is 7. Accordingly, the operating temperature range of liquid crystal phase or the rate of response may be improved by introducing a plurality of liquid crystal groups by using a plurality of spacers of different lengths per molecular chain. Particularly great improving effects can be produced when in using spacers whose longest length is twice or more the shortest length.

The liquid crystal compounds used in the present invention can be synthesized according to known methods as described, for example, in H. Fenkelmann, *Polymer Liquid Crystals*, 35, Academic Press (1982) and A. Rroviello, *J. Polym. Sci.*, Polym. Lett. Ed., 13, 445 (1975).

In the electrorheological fluid of the present invention, a single liquid crystal compound of the invention may be used alone or it may be used in a mixture with other liquid crystal compounds of the invention. Also, the liquid crystal compound of the present invention may have different kinds of liquid crystal groups in one molecular chain.

In particular, the electrorheological fluid formed of a mixture of the present liquid crystal compounds each having spacers of different lengths, such that the maximum length is twice or more as long as the minimum length, is preferable for the purpose of extending the operating temperature range for liquid crystal phase. Furthermore, the electrorheological fluid formed of a mixture of the present liquid crystal compounds and conventional compounds having one liquid crystal group in a molecule is preferable for the purpose of lowering basic viscosity in addition to the effects above mentioned.

In the present invention, the use of a dispersion with liquid crystal properties, comprising the liquid crystal compound as described above, is preferred for the purpose of improving the effects mentioned above.

Dispersion media which can be used for the present invention are materials having relatively low viscosities which show no crystal liquid properties alone and do not impair the liquid crystal properties of the liquid crystal compound so as to provide the dispersion with liquid crystal properties. The dispersion medium should have strong affinity for the molecular chain and poor affinity for the liquid crystal groups. For example, in the case of the crystal liquid compound of dimethyl silicone having a benzoic ester-type liquid crystal group bonded thereto at side chain, the use of toluene, dichloromethane, and the like, which have too strong an affinity for the liquid crystal group, results in dissolving the liquid crystal compound so as to lose electrorheological effect. On the other hand, dimethyl silicone, phenyl methyl silicone with a small number of phenyl groups are preferably used for the crystal liquid compound of dimethyl silicone having a benzoic ester-type liquid crystal group bonded thereto at side chain.

For selection of a suitable dispersion medium, a simple method can be employed, wherein the material is mixed with an equal amount of the liquid crystal compound and dissolved with heating, and the change in the liquid crystal property is examined with the solution interposed between polarization plates.

It is also necessary to use a dispersion medium which does not greatly lower the resistivity of the dispersion, since if the resistivity of the dispersion is too low, it cannot be used for an electrorheological fluid.

The amount of the dispersion medium contained in the dispersion may be 1 to 90% by weight, preferably 5 to 80% by weight.

The Lyotropic Liquid Crystals

Next, the lyotropic liquid crystal of the electrorheological fluid of the present invention will be described.

The inventors have searched for various combinations of solutes and solvents which can provide lyotropic liquid crystals and, as a result, found that extremely great electrorheological effects are manifested in some, but not in all, combinations which produce lyotropic liquid crystals. A close examination of lyotropic liquid crystals showing no substantial electrorheological effect revealed that they readily pass a large electric current. As a result of further investigations of the insulating properties of lyotropic liquid crystals, the inventors have now discovered that lyotropic liquid crystals having an electrical resistance above a given level produce great electrorheological effects. Thus, the inventors arrived at the present invention which relates to a homogeneous electrorheological fluid comprising a lyotropic liquid crystal which is a selected combination of a solute and a solvent selected so as to have a resistivity above a given level. The lyotropic liquid crystal which can be used in the present invention preferably has a resistivity of not less than $10^8$ Ωcm, and particularly not less than $10^9$ Ωcm. Impurities in the lyotropic liquid crystal which cause reduction in resistance are preferably minimized.

Solutes which can be used in the lyotropic liquid crystals of the present invention include aramid resins, cellulose and its derivatives, polyamide hydrazide, polyhydrazide, polypeptide, polyphosphazene, polyisocyanate, amphipathic block copolymers having both hydrophilic blocks and hydrophobic blocks, and ribonucleic acid and deoxyribonucleic acid present in living bodies. Preferred solutes are cellulose and its derivatives, polypeptide, and amphipathic block copolymers.

Of these solutes, preferred are those having a molecular weight of 1,000 or more, and more preferably greater than 10,000. It is preferable that the solutes have a broad molecular weight distribution (Mw/Mn of 2 or more) for the purpose of extending the operating temperature range for liquid crystal phase and providing a lower basic viscosity.

In general, solvents useful in the lyotropic liquid crystals should have high polarity and permit conduction of electricity. The solvents to be used in the present invention are capable of dissolving the solute while having high insulating properties, preferably the above-recited resistivity. For example, polypeptide forming a stiff helical structure owing to hydrogen bonding strength and exhibiting a cholesteric liquid crystal phase, can be combined with suitable solvents such as dioxane, tetrahydrofuran, methylene chloride, and chloroform. Suitable solvents such as ethylbenzene and nitromethane can be combined with an amphipathic block copolymer comprising styrene and ethylene oxide which shows a smectic liquid crystal phase. Suitable solvents which can be combined with the following cellulose derivatives include dioxane for acetyl cellulose; acrylonitrile, dimethyl sulfoxide (DMSO), and dioxane for cyanoethyl cellulose; chloroform, dichloromethane, carbon tetrachloride, and trichloroethane for ethyl cellulose; methylene chloride, DMSO, dioxane, and acetonitrile for hydroxypropyl cellulose; and DMSO and dioxane for cellulose tricarballylate. In forming the above-described combination, the solvents respectively described above may be used either individually or in combinations of two or more thereof.

The lyotropic liquid crystal used in the present invention can be selected from those which exhibits liquid crystal properties and possesses high insulating properties, e.g., a resistivity of not less than $10^8$ $\Omega$cm and particularly not less than $10^9$ $\Omega$cm, without limitation of the type of the liquid crystal phase exhibited and the concentration of the solute. The concentration of the solute suitable for exhibiting liquid crystal properties is generally within the range of 10 to 50 wt %, preferably 15 to 30 wt %, which is described in literatures relating to the solute to be used (e.g., C. Robinson, *Trans. Fraday Soc.*, 52,571 (1956) for poly ($\gamma$-benzyl-L-glutamate) and JP-A-51-96230 for celluloses).

Electrorheological effects of the electrorheological liquid comprising the above-described liquid crystal compound or lyotropic liquid crystal are obtained within a temperature range where a liquid crystal phase is exhibited, but are not substantially obtained at higher temperatures where an isotropic phase is exhibited. While the effects are obtained on application either of direct voltage or of alternating voltage, at a voltage of about from 0.2 to 3 kv/mm, it is desirable to use alternating voltage or pulsating direct voltage because application of direct voltage may cause trouble in long-term continuous operation as is usual with general low-molecular liquid crystals. Further, when a method is used similar to those used for low-molecular liquid crystals in the field of display, it is possible to increase the rate of response by using a double-frequency addressing scheme, depending on the kind of the liquid crystal groups (see *Nihon Kagakukai Dai 58-kai Shunki Nenkai Yokoshu*, 2, 1140 (1989)). Electrorheological effects of the conventional fine dispersion type electrorheological liquids increase in proportion to the square of applied voltage. On the other hand, it appears that the rate of increase of the electrorheological effects of the electrorheological fluid of the present invention is reduced at voltages above a certain level and the effects reach saturation.

In the electrorheological liquid comprising the liquid crystal compound or the lyotropic liquid crystal according to the present invention, the shear stress or rate of response tends to be influenced by the shear rate. In the present invention, it is expected that high electrorheological effect remains and the rate of response increases at high shear rates. Therefore, actuators using the electrorheological liquid of the present invention are preferably used at a high shear rate, e.g., 100 sec$^{-1}$ or higher.

In addition, considering that the electrorheological liquid of the present invention is especially well suited for use at a high shear rate, it is possible for the actuator to be operated at a substantially low applied voltage with a reduced electrode (e.g., 1 mm or less, preferably 0.5 mm or less) gap for applying the necessary field strength. When the electrode gap is reduced, there is a danger of short-circuiting due to contact between the electrodes. As a countermeasure, a small amount of spherical insulating particles may be dispersed in the electrorheological liquid to avoid short-circuiting or to keep the electrodes a certain distance apart. For instance, with the electrode gap being set at 100 $\mu$m, spherical insulating particles having a particle size of not greater than 100 $\mu$m, and preferably of from 1 to 80 $\mu$m, can be dispersed in such a proportion which suffices for the purpose without impairing other performance properties, i.e., in a range of from 0.01 to 10 vol % based on the liquid. Such fine particles include those having a specific gravity as close to that of the liquid crystal compound as possible, for example, particles of organic polymers such as silicone, polystyrene, polymethyl methacrylate and polethylene or inorganic substances (e.g., hollow particles) such as silica and alumina.

The electrorheological fluid of the present invention can be rendered stable for long periods of time even at a high temperature of 120° C. or greater, by suitably selecting the liquid crystal group, the molecular chain, the dispersion medium, etc.

The homogeneous electrorheological liquid according to the present invention exhibits excellent response properties without the accompanying sedimentation or flocculation of dispersed particles that has been one of serious drawbacks associated with the conventional particle-dispersed type electrorheological fluids. Therefore, it can be used as compact and electronically controllable actuators for valves, clutches, brakes, torque converters, etc. for an extended period of time in a stable manner. Applications to high precision servo control systems are particularly expected.

That is, the electrorheological fluid of the present invention can be incorporated into actuators for torque transmission (such as clutch, brake and power transmission), vibration absorption (such as shock absorber, engine mount and damper), fluid control (such as servo value and pressure valve), etc., according to the above references relating to a conventional particle-dispersed type electrorheological fluid.

Furthermore, the electrorheological fluid of the invention is also expected to be used for novel micro actuators taking advantage of merits of no sedimentation of particles, no abrasion, and narrow electrode gap.

The present invention will now be described in greater detail with reference to the following Examples, but it should be understood that the present invention is not deemed to be limited thereto. All percents and ratios are by weight unless otherwise indicated.

Electrorheological effects, glass transition temperature (Tg), dielectric anisotropy, resistivity, and liquid crystal properties of electrorheological liquids obtained were measured according to the following methods.

1) Electrorheological Effects

Electrorheological effect was examined using a plate-plate type rotating viscometer which was modified to form an electrode on opposite faces of the plate as a whole, equipped with a pair of parallel disks in which the lower disk is rotated by a motor and the upper disk is connected to a torque meter to show the shear stress. The generated shear stress, which resulted when a sample interposed between electrodes was subjected to a shear at a predetermined temperature and a predetermined shear rate, and the current value were determined when a predetermined voltage was applied (The term "generated shear stress" as used herein means an increase in shear stress upon application of a voltage). In the present Examples, the electrode diameter at the opposing portions was 32 mm and the electrode gap was 0.5 mm. The shear rate was fixed at 200 sec$^{-1}$, and a direct voltage of 0 to 2 kv/mm was applied unless otherwise indicated.

2) Dielectric Anisotropy

Dielectric anisotropy was determined in accordance with Standard of Electronic Industries Associated of Japan, EIAJ ED-2521 (Feb., 1990), "Measuring Methods for Liquid Crystal Display Panels and Constructive Materials." A sample liquid was put in each of two liquid crystal cells comprised of a pair of parallel transparent electrode plates, one for homeotropic orientation and the other for homogeneous orientation. The electrostatic capacity of each cell was measured at a prescribed temperature operating temperature) and a prescribed frequency (50 Hz). Dielectric anisotropy was obtained by subtracting the electrostatic capacity of the latter cell from that of the former cell.

3) Resistivity

Measured in accordance with JIS C-2101 "Measuring Method for Electrically Insulating Liquids". A sample liquid was inserted between a pair of parallel electrodes. The resistivity was measured when a voltage of from 10 to 100 V/mm was applied.

4) Liquid Crystal Properties

Observed by means of a differential scanning calorimeter (DSC)(model DSC-50, mfd. by Shimazu Seisakusho K.K.) and a polarizing microscope. In a more convenient method, liquid crystal properties can also be determined by observing polarization of a sample interposed between a pair of polarizing plates.

5) Tg

Measured with a DSC or a dilatometer.

The results of measurements of the electrorheological effects of the liquid crystal compounds made as described in Examples 1 to 18 are shown in Table 1 below.

EXAMPLE 1

1) Synthesis of Liquid Crystal Compound A

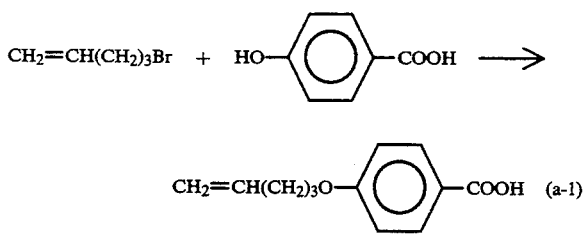

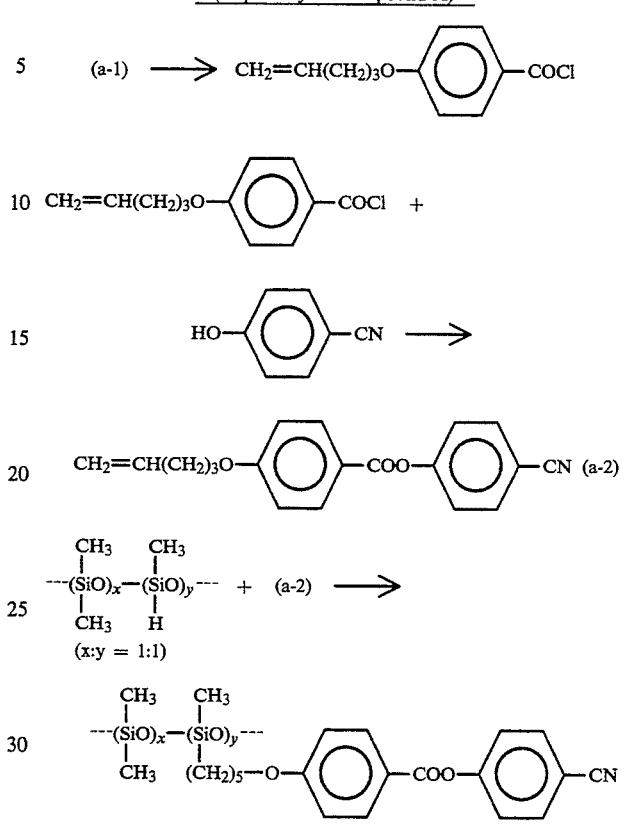

In a mixed solution of 30 g of potassium hydroxide, 40 ml of water, and 190 ml of ethanol was dissolved 37 g of phydroxybenzoic acid, and 0.3 g of potassium iodide was added thereto. To the solution 40 g of 5-bromopentene was added dropwise, and the mixture was refluxed at 80° C. for 12 hours. The reaction mixture was poured into 400 ml of water adjusted to pH 3 with hydrochloric acid. The precipitate thus formed was dissolved in ethanol at 70° C. for recrystallization to obtain about 40 g of compound (a-1) as a white tabular crystal.

To 14 g of compound (a-1) were added 16 g of thionyl chloride and a few drops of dimethylformamide, followed by stirring at room temperature for 30 minutes. Excess thionyl chloride was removed in vacuo, and the residue was dissolved in 110 ml of tetrahydrofuran (THF). The solution was added dropwise to 280 ml of THF at 5° C. having dissolved therein 8 g of p-cyanophenol and 9 g of triethylamine, followed by stirring at 5° C. for 4 hours. THF was removed by distillation under reduced pressure, and the residue was dissolved in 300 ml of dichloromethane and washed with water three times by using a separatory funnel. After dehydrating over sodium sulfate, the mixture was purified by passing through a column packed with silica gel ("Wako Gel C200" produced by Wako Pure Chemical Industries, Ltd.). Dichloromethane was removed from the effluent by distillation, and the residue was recrystallized from ethanol at 70° C. to obtain about 20 g of compound (a-2) as a white needle crystal.

In 110 ml of toluene were dissolved 6 g of a copolymer silicone comprising monomethylsiloxane (A) and dimethylsiloxane (B) (A/B molar ratio=1/1; degree of polymerization=about 30) and 14 g of compound (a-2), and 10 mg of chloroplatinic acid hexahydrate was added thereto, followed by allowing the mixture to react at 80° C. for 24 hours. Toluene was removed from the reaction mixture by distillation, and the residue was washed with ethanol at 70° C., dissolved in 150 ml of dichloromethane, and passed through a column of silica gel to remove any unreacted matters. dichloromethane was removed from the effluent by heating in vacuo to obtain about 20 g of liquid crystal compound A having a liquid crystal group in its side chain.

The infrared absorption spectrum of liquid crystal compound A showed a markedly weakened absorption assigned to SiH at 2140 cm$^{-1}$ and, instead, strong absorptions assigned to a cyano group at 2235 cm$^{-1}$ and to a carboxyl group at 1735 cm$^{-1}$.

2) Liquid Crystal Behavior

Observations of the liquid crystal behavior of liquid crystal compound A with a DSC and under a polarizing microscope equipped with a heating plate revealed a smectic phase in a temperature range of from room temperature to 90° C. (dielectric anisotropy of 10 to 20).

3) Electrorheological Effects

Measurements were made at 85° C. (smectic phase) and 120° C. (isotropic phase). It can be seen from Table 1 that no electrorheological effect is produced in the isotropic phase.

EXAMPLE 2

1) Synthesis of Liquid Crystal Compound B removed in vacuo. The acid chloride was dissolved in 100 ml of THF, and the solution was added dropwise to 250 ml of THF at 0° C. having dissolved therein 12 g of a p- cyanophenol and 13 g of triethylamine, followed by stirring at 0° C. for 1 hour. THF was removed in vacuo, and the residue was dissolved in dichloromethane and washed with water. Purification by silica gel column chromatography ("Wako Gel C200") yielded 26 g of compound (b-2).

3.5 g of $\alpha,\omega$-bis(hydrogen) polydimethylsiloxane ("TSL 9546" produced by Toshiba Silicone K.K.) and 5.0 g of compound (b-2) were dissolved in toluene, and 2 mg of chloroplatinic acid hexahydrate was added to the solution, followed by refluxing at 80° C. for 24 hours. Toluene was removed, and the residue was purified by silica gel column chromatography ("Wako Gel C200") to obtain 4.5 g of liquid crystal compound B having introduced a liquid crystal group at both terminals of the siloxane skeleton.

The infrared absorption spectrum of liquid crystal compound B revealed disappearance of an absorption assigned to Si-H at 2128 cm$^{-1}$ and showed instead absorptions assigned to a cyano group at 2222 cm$^{-1}$ and a carboxyl group at 1733 cm$^{-1}$.

2) Fluid Crystal Behavior

As a result of observations on the liquid crystal behavior by means of a DSC and a polarizing microscope equipped with a heating plate, compound (b-2) and liquid crystal compound B were confirmed to exhibit a (Liquid crystal compound B)

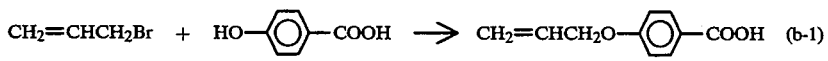

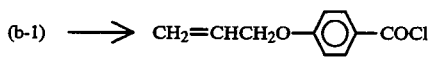

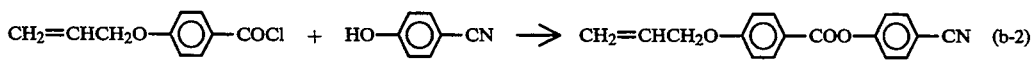

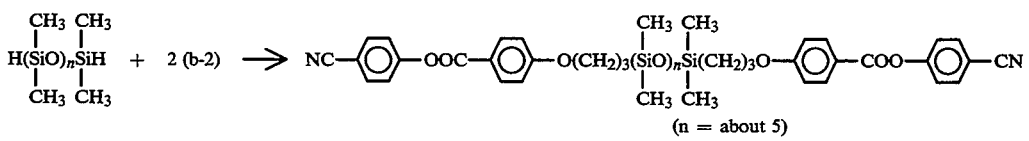

(n = about 5)

In a mixed solution of 100 g of potassium hydroxide and 500 ml of ethanol in 120 ml of water were dissolved 99 g of phydroxybenzoic acid and 0.7 g of potassium iodide, and 86 g of allyl bromide was added thereto dropwise. The resulting solution was refluxed at 80° C. for 12 hours. After cooling, 150 ml of water was added to the reaction mixture, and the pH was adjusted to 3 with hydrochloric acid. The precipitate thus formed was collected by filtration and recrystallized from ethanol to give 90 g of compound (b-1).

To 17 g of compound (b-1) were added 17 g of thionyl chloride and a few drops of dimethylformamide, followed by stirring at room temperature for 1 hour to prepare an acid chloride. Excess thionyl chloride was liquid crystal phase in a temperature range of from room temperature to 110° C. and of from room temperature to 70° C., respectively (dielectric aniosotropy of 10 to 20).

3) Electrorheological Effects

Measurements were made at 25° C. (smectic phase) and 80° C. (isotropic phase). It can be seen from Table 1 that liquid crystal compound B has a low base viscosity and therefore exhibits great electrorheological effects even at room temperature.

EXAMPLE 3

1) Synthesis of Liquid Crystal Compound C (Liquid crystal compound C)

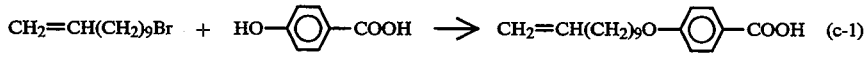

-continued (Liquid crystal compound C)

(c-1)

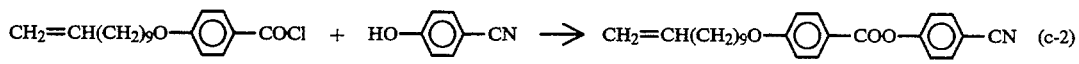
(c-2)

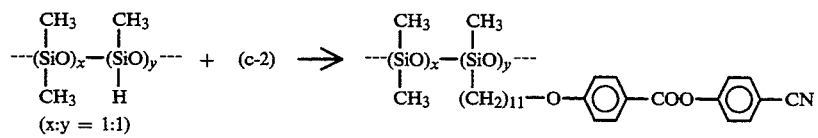
(x:y = 1:1)

p-Hydroxybenzoic acid (28 g) and 10-bromoundecylene (47 g) were reacted in the same manner as in Example 1 to obtain about 20 g of compound (c-1) as a pale yellow substance.

To 16 g of compound (c-1) were added 10 g of thionyl chloride and a few drops of dimethylformamide, followed by stirring at room temperature for 30 minutes. Excess thionyl chloride was removed in vacuo, and the resulting acid chloride was dissolved in 90 ml of THF, and the solution was added dropwise to 220 ml of THF at 5° C. having dissolved therein 7 g of p-cyanophenol and 7 g of triethylamine, followed by stirring at 5° C. for 4 hours. THF was removed by distillation under reduced pressure, and the residue was dissolved in 200 ml of dichloromethane and washed with water three times by means of a separatory funnel. After dehydration over sodium sulfate, the solution was purified by silica gel column chromatography ("Wako Gel C200"). Dichloromethane was removed from the effluent by distillation, and the residue was recrystallized from ethanol at 70° C. to obtain 19 g of compound (c-2).

In 200 ml of toluene were dissolved 8 g of a copolymer silicone comprising monomethylsiloxane (A) and dimethylsiloxane (B) (A/B molar ratio=1/1; degree of polymerization=about 30) and 21 g of compound (c-2), and 10 mg of chloroplatinic acid hexahydrate was added thereto, followed by allowing the mixture to react at 80° C. for 24 hours. Toluene was removed from the reaction mixture by distillation, and the residue was washed with ethanol at 70° C. dissolved in 50 ml of dichloromethane, and passed through a column of silica gel to remove any unreacted matters. Dichloromethane was removed from the effluent by heating in vacuo to obtain about 16 g of liquid crystal compound C having a liquid crystal group in its side chain.

The infrared absorption spectrum and NMR spectrum of liquid crystal compound C revealed disappearance of an absorption assigned to SiH and showed instead strong absorptions assigned to a cyano group and a carboxyl group.

2) Liquid Crystal Behavior

As a result of observations on the liquid crystal behavior by means of a DSC and polarizing microscope equipped with a heating plate, it was confirmed that liquid crystal compound C exhibits a smectic phase in the vicinity of 70° C. (dielectric anisotropy of 10 to 20) and an isotropic phase in the vicinity of 105° C.

3) Electrorheological Effects

Measurements were made at 85° C. (smectic phase) and 120° C. (isotropic phase).

EXAMPLE 4

1) Synthesis of Liquid Crystal Compound D (Liquid crystal compound D)

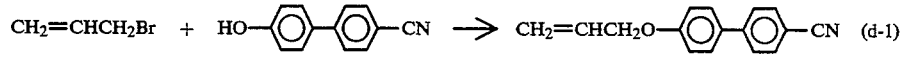

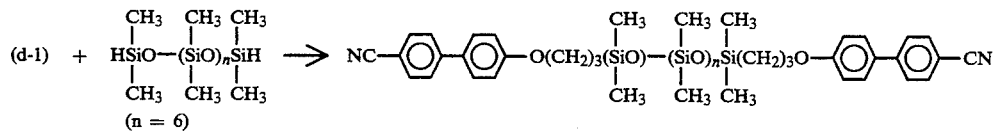
(n = 6)

In a mixed solution of 3.75 g of potassium hydroxide and 300 ml of ethanol in 30 ml of water were dissolved 10.5 g of 4-cyano-4'-hydroxydiphenyl and 0.05 g of potassium iodide, and 6.23 g of allyl bromide was added thereto dropwise. The resulting solution was refluxed at 80° C. for 12 hours. After cooling, 50 ml of water was added to the reaction mixture, and the pH was adjusted to 3 with hydrochloric acid. The precipitate thus formed was collected by filtration and purified by silica gel column chromatography ("Wako Gel C200") to give 10.2 g of compound (d-1).

9.4 g of α,ω-bis(hydrogen)-polydimethylsiloxane ("TSL 9586") and 6.1 g of compound (d-1) were dissolved in toluene, and 0.1 mg of chloroplatinic acid hexahydrate was added to the solution, followed by refluxing at 120° C. for 24 hours. Toluene was removed, and the residue was purified by silica gel column chromatography ("Wako Gel C200") to obtain 10.5 of liquid crystal compound D having introduced a liquid crystal group at both terminals of the siloxane skeleton.

2) Liquid Crystal Behavior

Liquid crystal compound D showed a liquid crystal phase in a temperature range of from −10° to 15° C. (dielectric anisotropy of 2 to 10) and an isotropic phase at 25° C. or higher.

3) Electrorheologic Effects

Measurements were made at 5° C. As the temperature rose, the generated stress became smaller and completely disappeared at 25° C.

EXAMPLE 5

1) Synthesis of Liquid Crystal Compound E

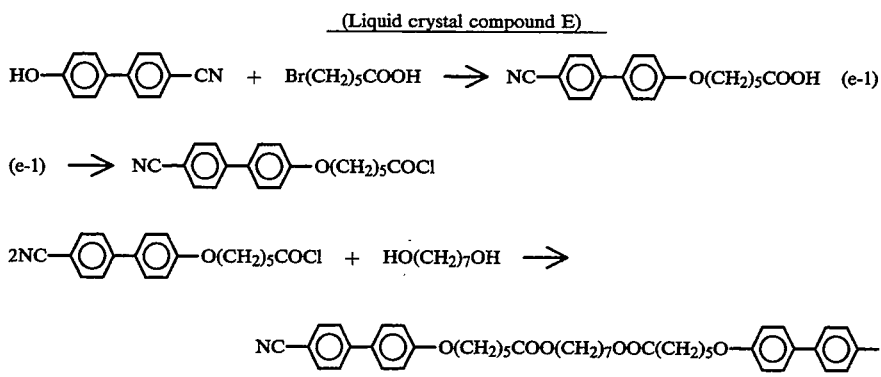

In a mixed solution of 8.0 g of potassium hydroxide and 200 ml of ethanol in 60 ml of water were dissolved 10.5 g of 4-cyano-4'-hydroxydiphenyl and 0.43 g of potassium iodide, and a solution of 10.6 g of 6-bromo-n-caproic acid in 50 ml of ethanol was added dropwise thereto. The resulting solution was refluxed at 85° C. for 18 hours. After cooling, 100 ml of water was added to the reaction mixture, and the pH was adjusted to 3 with hydrochloric acid. The precipitate thus formed was collected by filtration and recrystallized from ethanol to obtain 8.7 g of compound (e-1). Compound (e-1) was reacted with thionyl chloride to obtain an acid chloride, which was then dissolved in 30 ml of THF. The solution was added dropwise to 20 ml of THF at 0° C.-having dissolved therein 1.06 g of 1,7-heptanediol and 2.12 g of triethylamine, and the solution was stirred at 0° C. for 1 hour. THF was removed, and the residue was dissolved in dichloromethane, washed with water, and purified by silica gel column chromatography ("Wako Gel C200") to obtain 3.3 g of liquid crystal compound E.

2) Liquid Crystal Behaviors

Liquid crystal compound E exhibited a liquid crystal phase in a temperature range of from 25° C. to 80° C. (dielectric anisotropy of 2 to 10).

3) Electrorheological Effects

Measurements were made at 71° C. The generated shear stress was reduced in the temperatures higher or lower than 71° C.

EXAMPLE 6

1) Synthesis of Liquid Crystal Compound F

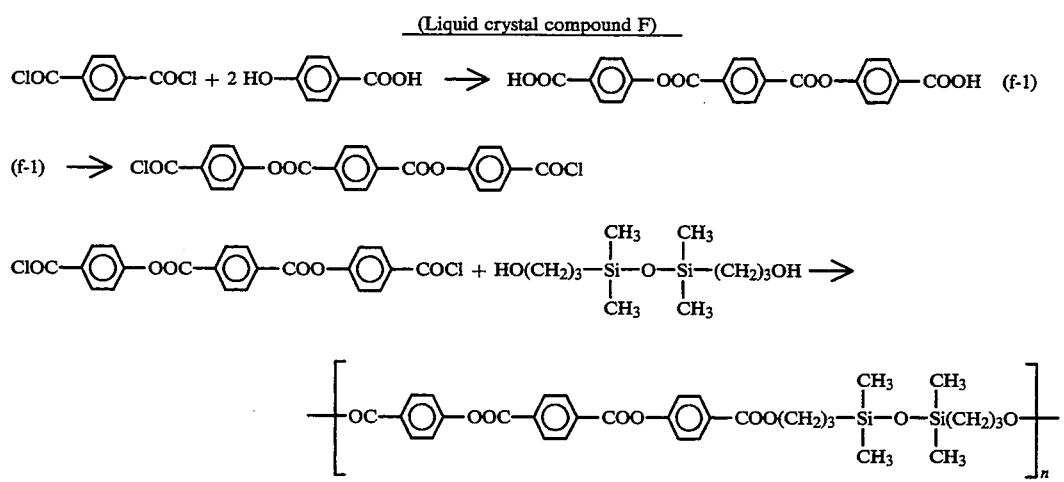

A solution of 15.9 g of terephthalic acid chloride in 250 ml of diethyl ether was added dropwise to 400 ml of diethyl ether at 0° C. having dissolved therein 21.6 g of phydroxybenzoic acid and 79.3 g of triethylamine, followed by stirring at 0° C. for 1 hour. The solution was adjusted to pH 2 with hydrochloric acid, and the precipitate formed was collected by filtration, washed with water, and dried to obtain 20.1 g of compound (f-1). An aliquot of compound (f-1) was reacted with thionyl chloride to prepare an acid chloride, and 3.0 g of the acid chloride was dissolved in 50 ml of 1,1,2,2-tetrachloroethane (TCE) and reacted with 2.1 g of 1,3-bis(3-hydroxypropyl)-1,1,3,3,-tetramethyldisiloxane ("LS 7400" produced by Shin-etsu Chemical Industry Co., Ltd.) at 100° C. for 24 hours in a nitrogen stream. TCE was removed by distillation, and the residue was dissolved in methylene chloride and washed with water by using a separatory funnel to remove the acid component. Methylene chloride was then removed by distillation to obtain 4.5 g of liquid crystal compound F as a hard and glutinous substance.

2) Liquid Crystal Behavior

Liquid crystal compound F alone did not show distinct liquid crystal properties at room temperature but exhibited liquid crystal properties in the vicinity of 0° C. When it was mixed with 30% of dimethyl silicone (20 cp; hereinafter abbreviated as DMS) and heated, the mixture exhibited distinct liquid crystal properties in the temperature range of from 70° to 95° C.

3) Electrorheological Effects

Measurements were made on the above-prepared mixture with DMS heated to 80° C. while applying a direct or alternating voltage (50 Hz).

EXAMPLE 7

1) Synthesis of Liquid Crystal Compound G

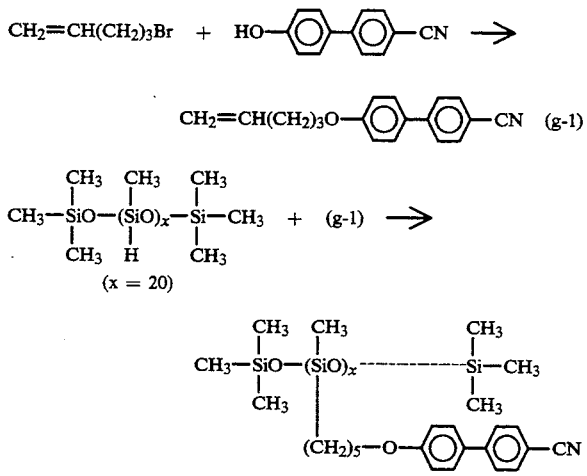

In the same manner as in the synthesis of compound (a-1) of Example 1, 12.3 g of p-cyanobiphenol and 9.5 g of 5-pentyl bromide were reacted to obtain about 11 g of compound (g-1).

In 400 ml of toluene were dissolved 7.8 g of monomethyl silicone (degree of polymerization: about 20) and 41 g of compound (g-1), and 2 mg of chloroplatinic acid hexahydrate was added thereto, followed by allowing the mixture to react at 80° C. for 24 hours. Toluene was removed by distillation, and the residue was washed with ethanol at 70° C. and then passed through a column of silica gel to remove any unreacted matter. Dichloromethane was removed by heating in vacuo to obtain about 40 g of liquid crystal compound G having a liquid crystal group in the side chain thereof.

The IR spectrum and NMR spectrum of liquid crystal compound G revealed a marked reduction of the absorption assigned to SiH and strong absorptions assigned to a cyano group and a carboxyl group.

2) Liquid Crystal Behavior

A smectic phase was exhibited in a temperature range of from room temperature to 140° C.

3) Electrorheological Effects

Measurements were made at 90° C. The generated shear stress was lower despite of the higher content of the liquid crystal group as compared with liquid crystal compound A. This is believed to be due to lower dielectric anisotropy of the liquid crystal group in liquid crystal compound G, though positive, as compared with that of the liquid crystal group of liquid crystal compound A.

EXAMPLE 8

1) Synthesis of Liquid Crystal Compound H

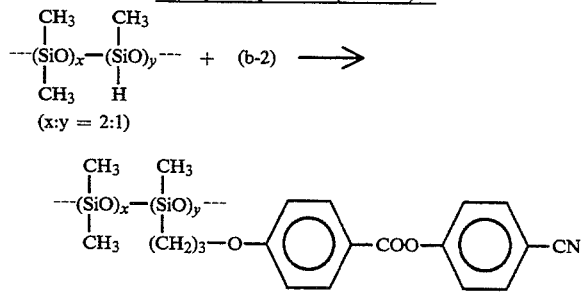

In 70 ml of toluene were dissolved 9.8 g of compound (b-2) prepared in the same manner as in Example 2 and 6.6 g of a copolymer silicone comprising monomethylsiloxane (A) and dimethylsiloxane (B) (A/B molar ratio=½; degree of polymerization: about 30), and 1 mg of chloroplatinic acid hexahydrate was added thereto, followed by allowing the mixture to react at 110° C. for 24 hours. Toluene was removed by distillation, and the residue was washed with ethanol and passed through a silica gel column to remove any unreacted matters. Dichloromethane was removed by heating in vacuo to obtain about 8 g of liquid crystal compound H having a liquid crystal group in the side chain thereof.

The infrared absorption spectrum and NMR spectrum of liquid crystal compound H showed disappearance of the absorption assigned to SiH and, instead, strong absorptions assigned to a cyano group and a carboxyl group, indicating that 90% or more of SiH was displaced with the liquid crystal group.

2) Liquid Crystal Behavior

Liquid crystal compound H exhibited a nematic phase in temperatures up to about 80° C. (dielectric anisotropy of 10 to 20) and an isotropic phase in temperatures of 90° C. or higher. When liquid crystal compound H was mixed with 50% of DMS (20 cp) or tetramethyltetraphenylsiloxane (TPS; 40 cp) and heated, the former mixture retained liquid crystal properties, while the latter mixture showed loss of liquid crystal properties.

3) Electrorheological Effects

Measurements were made on the above-prepared two mixtures containing DMS or TPS.

EXAMPLE 9

1) Synthesis of Liquid Crystal Compound I

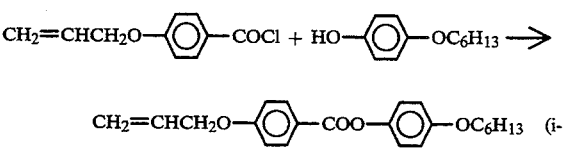

-continued (Liquid crystal compound I)

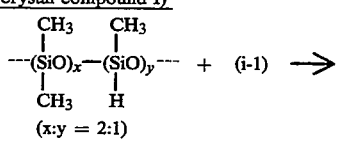
(x:y = 2:1)

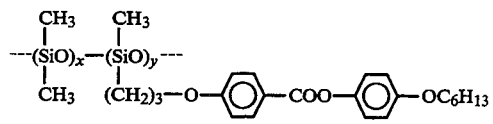

Compound (b-1) (12.5 g) synthesized in the same manner as in Example 2 was converted to its acid chloride with thionyl chloride, and the acid chloride was reacted with 13.6 g of phexyloxyphenol in THF in the same manner as in Example 2 to obtain about 20 g of compound (i-1).

In the same manner as in Example 2, 10.6 g of compound (i-1) and 6.3 g of a copolymer silicone comprising monomethylsiloxane (A) and dimethylsiloxane (B) (A/B molar ratio=$\frac{1}{2}$; degree of polymerization: about 30) were dissolved in 65 ml of toluene, and 1 mg of chloroplatinic acid hexahydrate was added thereto, followed by allowing the mixture to react at 110° C. for 24 hours. Toluene was removed by distillation, and the residue was washed with ethanol and passed through a silica gel column to remove any unreacted matters. Dichloromethane was removed by heating in vacuo to obtain about 12 g of liquid crystal compound I having a liquid crystal group in the side chain thereof.

The infrared absorption spectrum and NMR spectrum of liquid crystal compound I showed disappearance of the absorption assigned to SiH and, instead, a strong absorption assigned to a carboxyl group, indicating that 95% or more of SiH was displaced with the liquid crystal group.

2) Liquid Crystal Behavior

Liquid crystal compound I exhibited liquid crystal properties in temperatures up to about 70° C. (dielectric anisotropy of −5 to 0) and an isotropic phase in temperature of 80° C. or higher.

3) Electrorheological Effects

Measurements were made on a heated mixture of liquid crystal compound I and 50% of DMS (20 cp). It was found that the generated shear stress and the rate of response were lower than those of the mixture of liquid crystal compound H obtained in Example 8 and DMS.

EXAMPLE 10

1) Synthesis of Liquid Crystal Compound J (Liquid crystal compound J)

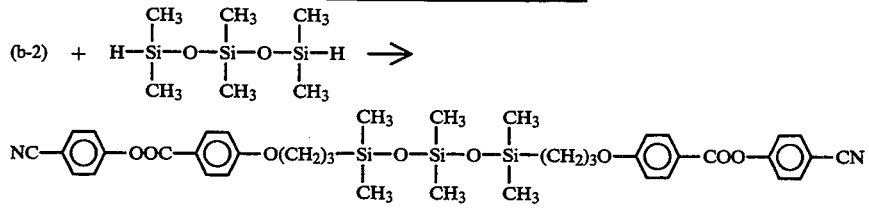

In toluene were dissolved 4.8 g of 1,1,3,3,5,5-hexamethyl-1,5-dihydrotrisiloxane ("H7322" produced by Chisso Corporation) and 12.8 g of compound (b-2) obtained in the same manner as in Example 2, and 0.1 mg of chloroplatinic acid hexahydrate was added thereto. The mixture was refluxed at 120° C. for 24 hours. Toluene was removed, and the residue was dissolved in dichloromethane and purified by silica gel column chromatography ("Wako Gel C200") to obtain 5.8 g of liquid crystal compound J having a liquid crystal group at both terminals of the siloxane skeleton.

2) Liquid Crystal Behavior

Liquid Crystal compound J exhibited liquid crystal properties in temperatures up to 65° C. and an isotropic phaco at temperatures of 70° C. higher.

3) Electrorheological Effects

Measurements were made on liquid crystal compound J alone and a mixture thereof with 30% of DMS (20 cp) at 50° C. and 70° C.

EXAMPLE 11

An equivalent weight mixture of liquid crystal compound H of Example 8 which has a liquid crystal group exhibiting positive dielectric anisotropy (10 to 20) and liquid crystal compound I of Example 9 which has a liquid crystal group exhibiting negative dielectric anisotropy (−5 to 0) was heated at 100° C. while sufficiently stirring. While each liquid crystal compound alone exhibited a nematic phase, the mixture exhibited a smectic phase at 75° C.

EXAMPLE 12

1) Synthesis of Liquid Crystal Compound K

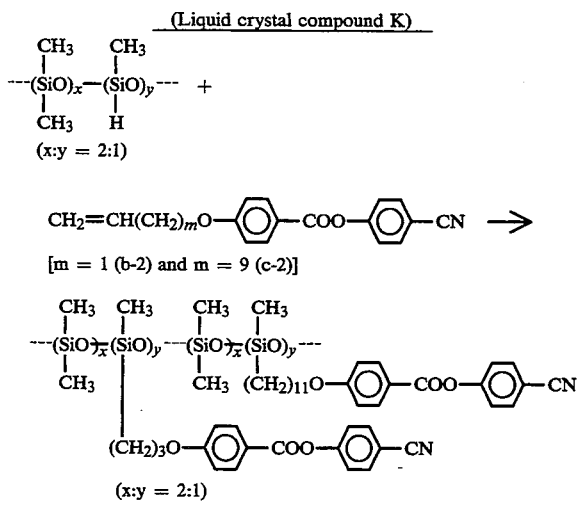

In 350 ml of toluene were dissolved 1.5 g of compound (b-2) obtained in Example 2, 2.1 g of compound (c-2) obtained in Example 3, and 2.0 g of a copolymer silicone comprising monomethylsiloxane (A) and dimethylsiloxane (B) (A/B molar ratio=½; degree of polymerization: about 30), and 1 mg of dicyclopentadienylplatinum, (II) chloride was added thereto, followed by allowing the mixture to react at 110° C. for 24 hours. Toluene was removed by distillation, and the residue was washed with ethanol, dissolved in 50 ml of dichloromethane, and passed through a silica gel column to remove any unreacted matter. Dichloromethane was removed from the effluent by heating in vacuo to obtain about 4 grams of liquid crystal compound K having a liquid crystal group in the side chain thereof.

2) Liquid Crystal Behavior

Liquid crystal properties were observed in a temperature range of from 25° to 130° C. (dielectric anisotropy of 10 to 20).

3) Electrorheological Effects

While the results shown in Table 1 are those measured at 90° C., liquid crystal compound K exhibited high electrorheological effects in a broader temperature range of from 60° to 100° C. as compared with liquid crystal compounds C or H.

EXAMPLE 13

1) Synthesis of Liquid Crystal Compound L

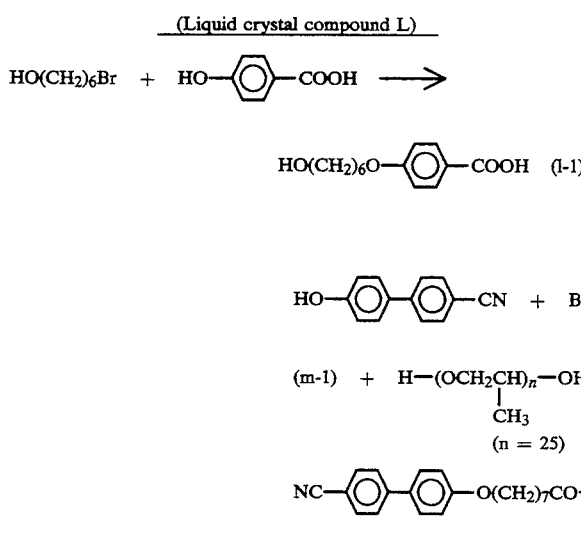

In the same manner as in Example 1, 18.3 g of 6-bromohexyl alcohol and 14.0 g of p-hydroxybenzoic acid were reacted in the presence of potassium hydroxide to obtain 16 g of compound (11).

12 g of compound (l-1), 30 ml of acrylic acid, 2 g of p-toluenesulfonic acid, and 2 g of hydroquinone were dissolved in 30 ml of chloroform, and the solution was refluxed in a Dean-Stark apparatus at 24 hours. After washing with water, chloroform was removed by distillation, and the residue was recrystallized to obtain about 9 g of compound (l-2). Then, 8.1 g of compound (l-2) was converted to its acid chloride by using thionyl chloride in the same manner as in Example 1, and the acid chloride was reacted with 3.0 g of p-methoxyphenyl in THF to obtain 9.5 g of compound (l-3).

In 100 ml of toluene were dissolved 9.0 g of compound (13) and, as a polymerization initiator, 0.15 g of azobisisobutyronitrile (AIBN) to conduct polymerization at 60° C. for 6 hours. After cooling, the reaction mixture was added dropwise to diethyl ether at 5° C. to precipitate. The collected solid was further purified by re-precipitation to obtain 7.5 g of liquid crystal compound L (Tg of acrylic molecular chain=3° C.) comprising an acrylate polymer having an average degree of polymerization of 30.

2) Liquid Crystal Behavior

Liquid crystal compound L exhibited a smectic phase in a temperature range of from room temperature up to 90° C. (dielectric anisotropy of 10 to 20) and an isotropic phase at 110° C.

EXAMPLE 14

1) Synthesis of Liquid Crystal Compound M

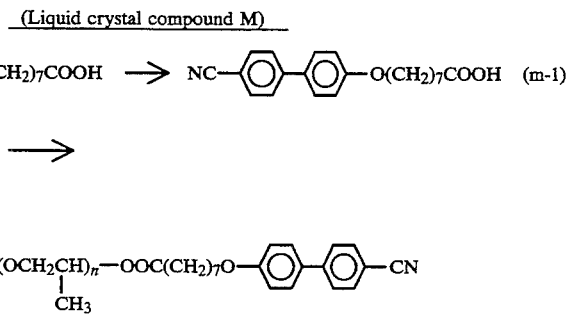

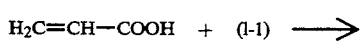

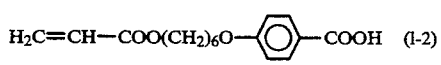

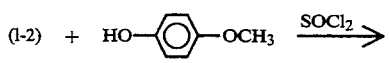

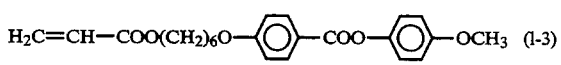

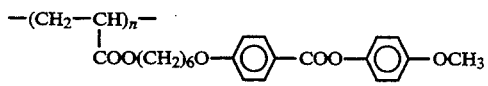

In a solution of 10.5 g of potassium hydroxide and 260 ml of ethanol in 80 ml of water were dissolved 13.3 g of 4-cyano-4'-hydroxydiphenyl and 0.56 g of potassium iodide, and a solution of 16.0 g of 8-bromooctanoic acid in 75 ml of ethanol was added thereto dropwise. The resulting solution was refluxed at 85° C. for 18 hours, followed by cooling. To the reaction mixture was added 130 ml of water, and the pH was adjusted to 3 with hydrochloric acid. The precipitate thus formed was collected by filtration and recrystallized from ethanol to obtain 12.0 g of compound (m-1).

To 400 ml of toluene were added 3.1 g of compound (m-1) and 10.3 g of polypropylene glycol (PPG, average molecular weight: 1500, Tg=−10° C.), and the mixture was refluxed at 130° C. for 46 hours while removing produced water. Toluene was removed, and the residue was dissolved in methylene chloride, neutralized with a saturated sodium hydrogencarbonate aqueous solution, and thoroughly washed with water, followed by concentration. The concentrate was dissolved in dichloromethane and purified by silica gel column chromatography ("Wako Gel G200") to obtain about 7 g of liquid crystal compound M.

2) Liquid Crystal Behavior

Weak liquid crystal properties were observed at a temperature of 35° C. or lower (dielectric anisotropy of 2 to 10).

3) Electrorheological Effects

Measurements were made at 15° C.

EXAMPLE 15

1) Synthesis of Liquid Crystal Compound N

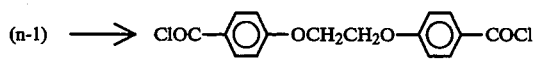

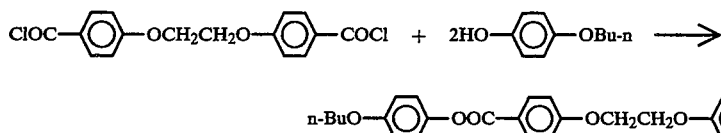

In a solution of 15.5 g of potassium hydroxide and 200 ml of ethanol in 50 ml of water were dissolved 6.5 g of ethylene glycol (Tg=−50° C.) and 0.63 g of potassium iodide, and a solution of 42.1 g of p-bromobenzoic acid in 150 ml of ethanol was added thereto dropwise. The resulting solution was refluxed at 85° C. for 20 hours. After cooling, 150 ml of water was added to the reaction mixture, and the pH was adjusted to 3 with hydrochloric acid. The precipitate thus formed was collected by filtration and recrystallized from ethanol to give 21.9 g of compound (n-1).

Compound (n-1) was converted to its acid chloride with thionyl chloride.

In 100 ml of THF was dissolved 18.2 g of the resulting acid chloride, and the solution was added dropwise to a solution of 17.9 g of p-butoxyphenol and 14.2 g of triethylamine in 120 ml of THF at 0° C., followed by stirring at 0° C. for 1 hour. THF was removed, and the residue was dissolved in dichloromethane, washed with water, and purified by silica gel column chromatography ("Wako Gel C200") to obtain 27.3 g of liquid crystal compound N.

2) Liquid Crystal Behavior

Liquid crystal properties were observed in a temperature range of from 110° to 130° C. (dielectric anisotropy of −5 to 0).

3) Electrorheological Effects

Measurements were made at 120° C. An electric current increased high at a high applied voltage, and measurements could not be made stably at a voltage of 2 kV/mm.

EXAMPLE 16

An equivalent weight mixture of liquid crystal compound C of Example 3 and liquid crystal compound H of Example 8 was heated at 100° C. with stirring and then evaluated for electrorheological effects at 90° C. A smectic phase was observed in the temperature range of from 60° to 90° C.

COMPARATIVE EXAMPLE 1

1) Synthesis of Liquid Crystal Compound R (Liquid crystal compound R)

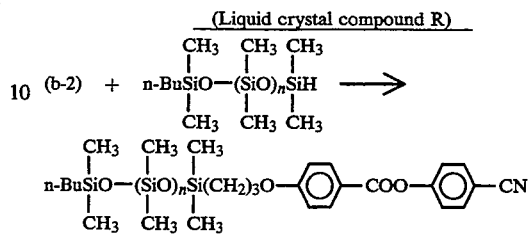

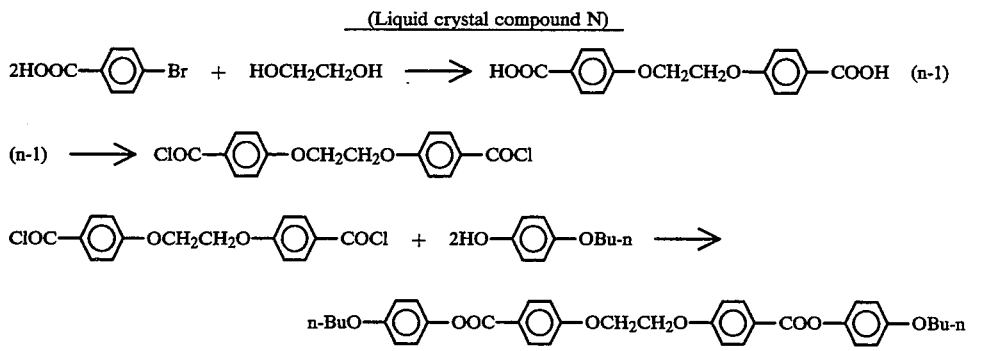

To a toluene solution of 10.5 g of a siloxane having SiH at one terminal thereof ("XC96-A5496" produced by Toshiba Silicone K.K.) and 3.7 g of compound (b-2) prepared in the same manner as in Example 2 was added 0.3 mg of chloroplatinic acid hexahydrate, and the mixture was refluxed at 120° C. for 20 hours. Toluene was removed from the reaction mixture, and the residue was purified by silica gel column chromatography ("Wako Gel C200") to obtain 4.9 g of liquid crystal compound R having a liquid crystal group at the siloxane terminal.

2) Liquid Crystal Behavior

No liquid crystal properties were exhibited at temperatures of 0° C. and higher.

3) Electrorheological Effects

No electrorheological effects were observed at any temperature.

EXAMPLE 17

An equivalent weight mixture of liquid crystal compound A of Example 1 and liquid crystal compound R of Comparative Example 1 hereinafter described was heated at 100° C. with stirring and then evaluated for electrorheological effects at 80° C. By mixing with liquid crystal compound R, the basic viscosity markedly decreased, and the rate of response was greatly improved.

EXAMPLE 18

Each of liquid crystal compound A of Example 1 and liquid crystal compound B of Example 2 was mixed with 30% of DMS (20 cp), and the mixture was heated to 100° C. while stirring. Electrorheological effects were then measured at 70° C. for the former mixture and at 25° C. for the latter mixture. In either case, a great stress was generated at a low voltage, and the rate of response was greatly improved.

TABLE 1

| Example No. | Liquid Crystal Compound | Measuring Temp. (°C.) | Electrorheological Effects | | | | | | Remark |
|---|---|---|---|---|---|---|---|---|---|
| | | | Gen. Shear Stress (Pa) Applied Voltage (kV/mm) | | | Electric Current (µA/cm²) Applied Voltage (kV/mm) | | | |
| | | | 0.5 | 1.0 | 2.0 | 0.5 | 1.0 | 2.0 | |
| 1 | A | 85 | 310 | 930 | 1760 | 0.1 | 0.2 | 0.4 | Smectic phase |
| | A | 120 | 0 | 0 | 0 | 0.2 | 0.4 | 0.8 | (Comparison) Isotropic phase |
| 2 | B | 25 | 410 | 790 | 1410 | 0.1 | 0.3 | 0.6 | Smectic phase |
| | B | 80 | 0 | 0 | 0 | 1.6 | 5.3 | 15 | (Comparison) Isotropic phase |
| 3 | C | 85 | 430 | 1800 | 3120 | 0.2 | 0.5 | 1.9 | Smectic phase |
| | C | 120 | 0 | 0 | 0 | 0.5 | 0.9 | 2.3 | (Comparison) Isotropic phase |
| 4 | D | 5 | 210 | 530 | 1020 | 0.1 | 0.1 | 0.2 | |
| | D | 25 | 0 | 0 | 0 | 0.4 | 0.9 | 2.8 | (Comparison) Isotropic phase |
| 5 | E | 71 | 60 | 180 | 440 | 1.8 | 5.7 | 12 | |
| 6 | F | 80 | 1160 | 2040 | 2220 | 0.8 | 2.7 | 4.6 | Direct voltage applied; DMS mixed |
| | F | 80 | 640 | 1020 | 1630 | 3.5 | 6.9 | 9.8 | Alternating voltage applied; DMS mixed |
| 7 | G | 90 | 320 | 680 | 1740 | 0.8 | 2.1 | 4.0 | |
| 8 | H | 70 | 1230 | 2320 | 3150 | 0.3 | 0.6 | 1.3 | DMS mixed |
| | H | 70 | 30 | 110 | 120 | 0.2 | 0.5 | 0.9 | (Comparison) TPS mixed; Liquid crystal phase lost |
| 9 | I | 65 | 160 | 360 | 610 | 0.2 | 0.7 | 1.2 | DMS mixed |
| | I | 95 | 0 | 0 | 0 | 0.6 | 1.9 | 3.0 | (Comparison) DMS mixed; Isotropic phase |
| 10 | J | 50 | 530 | 1150 | 1400 | 0.2 | 0.8 | 1.2 | |
| | J | 70 | 290 | 730 | 1050 | 0.3 | 1.1 | 1.9 | |
| | J | 50 | 840 | 2140 | 2430 | 0.1 | 0.3 | 0.6 | DMS mixed |
| | J | 70 | 960 | 1800 | 2070 | 0.2 | 0.6 | 1.1 | DMS mixed |
| 11 | H + I | 75 | 630 | 1370 | 2400 | 0.4 | 1.2 | 1.8 | |
| 12 | K | 90 | 380 | 1070 | 1280 | 0.1 | 0.2 | 0.4 | |
| 13 | L | 85 | 270 | 680 | 860 | 1.4 | 4.0 | 5.8 | |
| 14 | M | 15 | 60 | 510 | — | 8 | 30 | — | |
| 15 | N | 120 | 90 | 380 | — | 20 | 70 | — | |
| 16 | C + H | 90 | 520 | 1100 | 1920 | 0.8 | 2.0 | 3.1 | |
| 17 | A + R | 80 | 720 | 1530 | 2060 | 0.1 | 0.3 | 0.5 | |
| 18 | A | 70 | 1640 | 2820 | 3440 | 0.1 | 0.2 | 0.6 | DMS mixed |
| | B | 25 | 1290 | 2200 | 2810 | 0.1 | 0.3 | 0.4 | DMS mixed |
| 25 | O | 50 | 1400 | 2520 | 3510 | 0.3 | 0.5 | 1.0 | DMS mixed |
| | O | 100 | 1280 | 2340 | 2700 | 0.8 | 2.0 | 4.5 | DMS mixed |
| Comp. Example 1 | R | 5 | 0 | 0 | 0 | 0.1 | 0.2 | 0.5 | |
| | R | 15 | 0 | 0 | 0 | 0.1 | 0.4 | 0.7 | |
| | R | 40 | 0 | 0 | 0 | 0.2 | 0.5 | 0.9 | |

Lyotropic liquids crystals of the present invention are described in the following Examples 19-23.

EXAMPLE 19

Poly (γ-benzyl-L-glutamate) product of Polysciences, Inc.; molecular weight: 150,000 to 300,000; (hereinafter abbreviated as PBLG) was dissolved in 1,4-dioxane in a concentration of 25%. The solution was sealed into a cell, and electrorheological effects were measured at a temperature of 20° C., a shear rate of 400 sec$^{-1}$ and an applied voltage (DC) of from 0 to 2 kV/mm. The results obtained are shown in Table 2. It can be seen that the solution exhibits satisfactory electrorheological effects even at a low power. Further, the solution was inserted between a pair of polarizers. The change of light transmission with a twist of one polarizer at 90° proved that the solution exhibits a distinct liquid crystal phase. The solution had a resistivity of 10$^9$ Ωcm or higher.

TABLE 2

| | Applied Voltage (kV/mm) | | |
|---|---|---|---|
| | 0.5 | 1.0 | 2.0 |
| Generated Shear Stress (Pa) | 490 | 940 | 1220 |
| Current (µA/cm²) | 0.3 | 0.9 | 2.3 |

EXAMPLE 20

PBLG was dissolved in dichloromethane in a concentration of 25%, and electrorheological effects of the solution were measured under the same conditions as in Example 19. The results, shown in Table 3, indicate that the solution undergoes greater viscosity changes than the solution of Example 19, with the applied voltage being equal. While in Example 19 the generated stress simply increased with an increase of applied voltage, the solution of Example 20 revealed a phenomenon that the viscosity decreased with an increase of applied voltage in a low voltage region of up to about 0.4 kV/mn. Further, it was confirmed that the solution exhibits a distinct liquid crystal phase as observed in the same manner as in Example 19. The solution had a resistivity of 10$^9$ Ωcm or higher.

TABLE 3

| | Applied Voltage (KV/mm) | | |
|---|---|---|---|
| | 0.4 | 0.5 | 1.0 |
| Generated Shear Stress (Pa) | Δ250 | 560 | 1070 |
| Current (µA/cm²) | 3.3 | 4.9 | 14.2 |

EXAMPLE 21

Cyanoethyl cellulose (mfd. by Tokyo Kasei K.K., cyanoethylation ratio of 47%) was dissolved in dichloromethane in a concentration of 20%. It was confirmed that the solution exhibits a distinct liquid crystal phase as observed in the same manner as in Example 19. The solution had a resistivity of $2 \times 10^8$ Ωcm. The solution was sealed into a cell, and electrorheological effects were measured at a temperature of 20° C., a shear rate of 400 sec$^{-1}$ and an applied voltage (DC) of 0.5 kV/mm or higher, but measurements could not be made stably because a large current suddenly passed.

EXAMPLE 22

Figure 2:
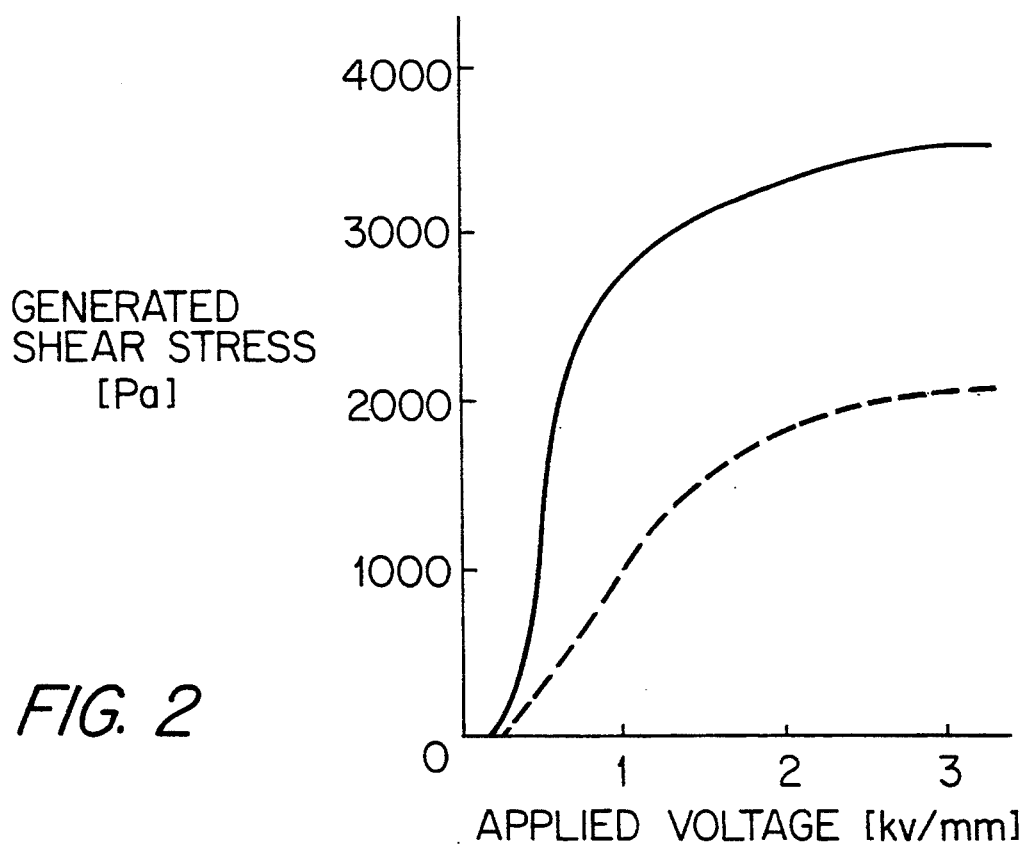
FIG. 2 is a plot showing applied voltage vs. generated shear stress plots of liquid crystal compound A (solid line) and a mixture of liquid crystal compound A and dimethyl silicone (dotted line).
Figure 3:
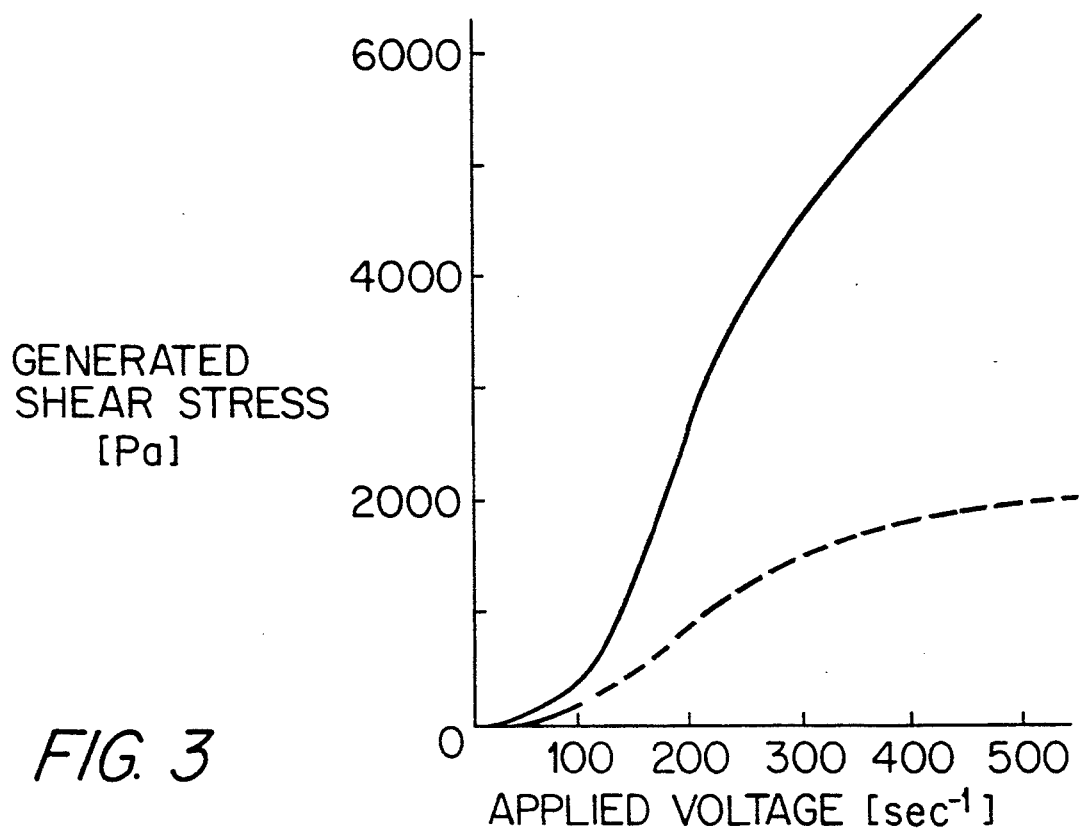
FIG. 3 is a plot showing shear rate vs. generated shear stress plots of liquid crystal compound A (solid line) and a mixture of liquid crystal compound A and dimethyl silicone (dotted line).

Influences of applied voltage (DC) and shear rate on electrorheological effects were examined on each of liquid crystal compound A of Example 1 alone and a mixture prepared by mixing liquid crystal compound A and 30% by volume of DMS (20 cp) and heating at 100° C. The results obtained are shown in FIGS. 2 an 3. In the Figs., the solid line and the dotted line indicate liquid crystal compound A alone and a liquid crystal compound A/DMS mixture, respectively.

EXAMPLE 23

Figure 4:
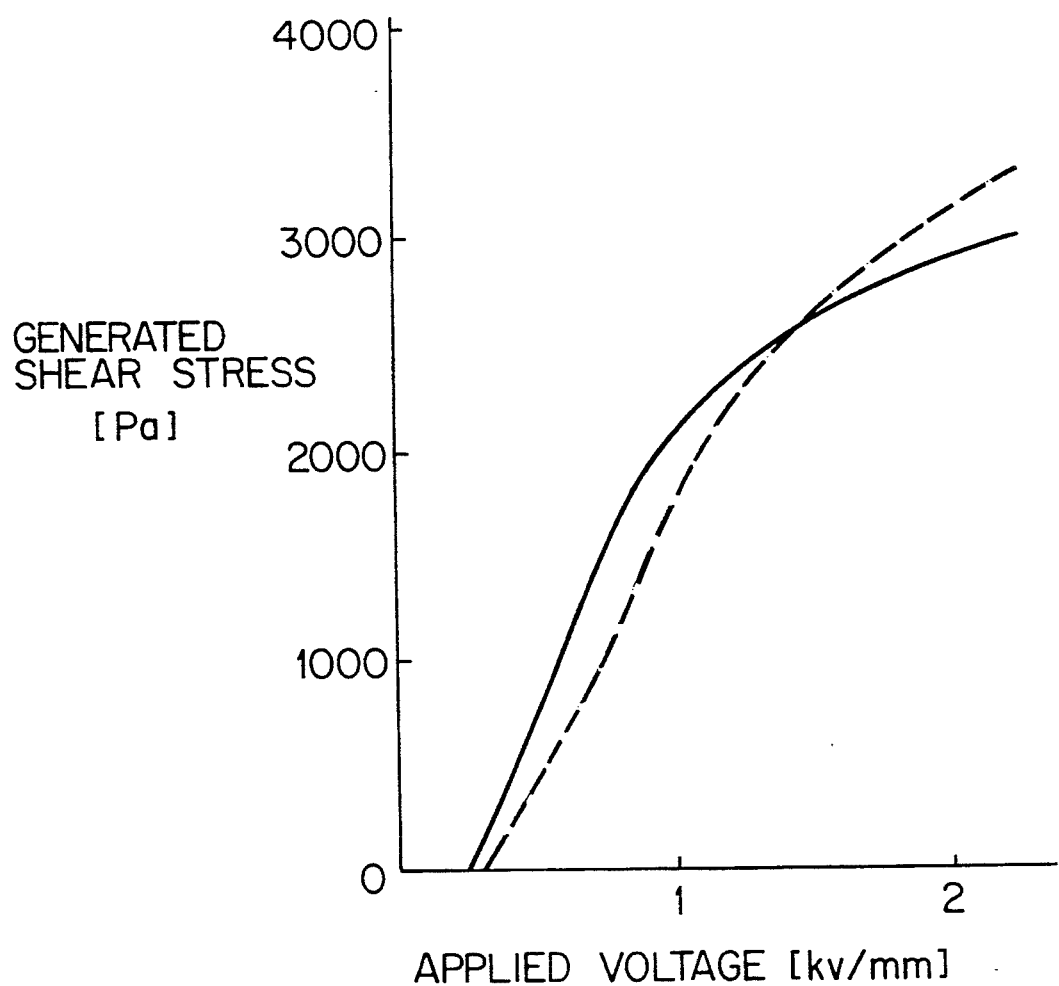
FIG. 4 is a plot of applied voltage vs. stress for liquid crystal compound C measured at an electrode gap of 100 $\mu$m (solid line) or 500 $\mu$m (dotted line).

Liquid crystal compound C of Example 3 was mixed with 1% of crosslinked styrene polymer spherical particles having a size distribution of from 20 to 80 μm. The resulting dispersion was interposed between the disks having an electrode gap of 100 μm, and electrorheological effects were measured at 85° C. and at a shear rate of 200 sec$^{-1}$. The results obtained are shown in FIG. 4 (solid line). For comparison, electrorheologial effects of liquid crystal compound C alone were measured at a shear rate of 200 sec$^{-1}$ by using disks having an electrode gap of 500 μm, and the results obtained are also shown in FIG. 4 (dotted line). It can be seen from FIG. 4 that the dependency on electrical field intensity is equal whether the electrode gap is 100 μm or 500 μm.

When the latter solution containing no styrene polymer particles was interposed between the disks having an electrode gap of 100 μm, measurements of electrorheological effects could not be made due to a contact of the electrodes which took place on vibration of the rotating lower disk.

EXAMPLE 24

Liquid crystal compound H of Example 8 was mixed with 30% of DMS (20 cp.) A direct voltage, an alternating voltage (50 Hz), or a pulsating direct voltage (duty ratio=1:1, 50 Hz) of 1.0 kV/mm (effective voltage) was applied to the solution at 80° C. to examine durability of electrorheologial effects. As a result, although the generated shear stress observed with a direct voltage was 2260 Pa in the initial stage, which was higher than those observed with an alternating voltage (1600 Pa) and a pulsating direct voltage (2030 Pa), it decreased with time to about 40% of the initial level. On the other hand, the generated shear stress obtained with an alternating voltage was low (slightly less than 70% of the initial level obtained with a direct voltage) in the initial stage of voltage application but maintained substantially the same level as the initial level even after 3 days. In the case of the pulsating voltage, the decreased in generated shear stress with time was smaller than that observed in the direct voltage application and the generated shear stress was maintained at a level of about 30% of the initial level.

EXAMPLE 25

1) Synthesis of Liquid Crystal Compound O

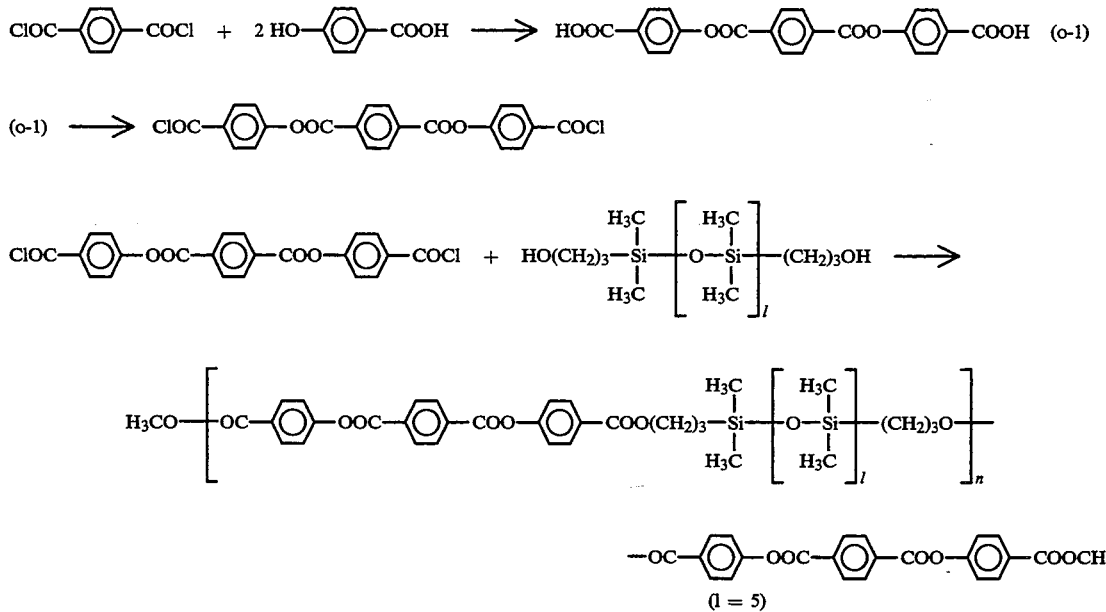

A solution of 15.9 g of terephthalic acid dichloride in 250 ml of dimethyl ether was added dropwise to 400 ml of dimethyl ether having dissolved therein 21.6 g of phydroxybenzoic acid and 79 g of triethylamine under ice-cooling, followed by stirring for 1 hour. The solution was adjusted to pH 3 with hydrochloric acid, and the precipitate formed was collected by filtration, washed with water, and dried to obtain 20.1 g of compound (o-1). The infrared absorption spectrum of compound (o-1) showed that an absorption assigned to —OH group at 1245 cm$^{-1}$ was lost and that assigned to

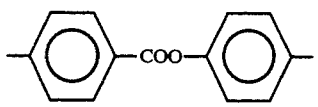

group at 1733 cm$^{-1}$ was recognized.

To 10.3 g of compound (o-1) were added 80 g of thionyl chloride and a few drops of dimethyl formamide, followed by stirring at 70° C. for 1 hour. Excess thionyl chloride was removed in vacuo to prepare 11.2 g of acid chloride.

4.64 g of the acid chloride and 4.19 g of silicone oil alcohol-modified at both terminals (F-235-80, mfd. by Nihon Yunika K.K.) were dissolved in 50 ml of 1,1,2,2-tetrachloroethane (TCE) and stirred at 100° C. for 24 hours in a nitrogen stream. TCE was removed by distillation after concentrating the solution, and the residue was dissolved in 150 ml of methylene chloride and neutralized by a saturated solution of sodium bicarbonate. The resulting solution was adjusted to pH 3 with hydrochloric acid and washed with water up to being pH 7 of water layer, followed by concentration and diactivation of the terminal by diazomethane to obtain 8 g of liquid crystal compound O.

2) Liquid Crystal Behavior

Liquid crystal compound O exhibited liquid crystal properties in the temperature range of from a room temperature to 95° C.

3) Electrorheological Effects

Measurements were made on the mixture of the liquid crystal compound O with 50% DMS (20 cp) at 50° C. and 100° C., since liquid crystal compound O has high basic viscosity at a room temperature.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles and its practical application to enable one skilled in the art to utilize the invention in various embodiments and with various modifications as are suited to the particular use contemplated.

While the invention has been described in detail and with reference to specific examples thereof, it will be apparent to one skilled in the art that various changes and modifications can be made therein without departing from the spirit and scope thereof, and it is intended that the scope of the invention be defined by the claims appended hereto, and their equivalents.

What is claimed is:

1. A method for changing the viscosity of a fluid of a liquid crystal compound comprising a molecular chain having at least two liquid crystal groups bonded thereto either directly or via a spacer, which comprises applying a voltage to said liquid crystal compound under a shear rate within a temperature range where said liquid crystal compound exhibits a liquid crystal phase.

2. The method of claim 1, wherein said molecular chain is a flexible molecular chain.

3. The method of claim 2, wherein an oligomer or polymer of a unit composing said molecular chain has a glass transition temperature of not higher than room temperature.

4. The method of claim 3, wherein said glass transition temperature is not higher than 0° C.

5. The method of claim 2, wherein said flexible molecular chain comprises a siloxane unit, an alkylene unit, or an oxyalkylene unit.

6. The method of claim 1, wherein said liquid crystal group has a positive dielectric anisotropy.

7. The method of claim 1, wherein said liquid crystal compound forms a smectic crystal phase.

8. The method of claim 1, wherein the length of the longest spacer is twice or more as long as the length of the shortest spacer per liquid crystal compound.

9. The method of claim 1, wherein said fluid comprises a mixture of said liquid crystal compounds each having spacers of different length such that the maximum length is twice or more as long as the minimum length.

10. The method of claim 1, wherein said fluid comprises a mixture of said liquid crystal compound and a liquid crystal compound having one liquid crystal group in a molecule.

11. The method of claim 1, wherein said fluid consists essentially of a dispersion with liquid crystal properties of said liquid crystal compound in a dispersion medium which exhibits no liquid crystal properties by itself.

12. The method of claim 11, wherein both of said molecular chain and said dispersion medium have a siloxane unit.

13. The method of claim 1, wherein said fluid contains from 0.01 to 10% by volume of insulating spherical particles having a particle size off from 1 to 100 μm.

14. The method of claim 1, wherein said liquid crystal compound is selected from the group consisting of:

(Liquid crystal compound A)

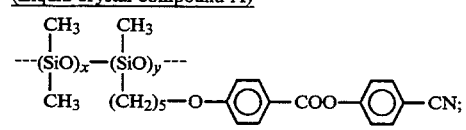

(i)

(x:y = 1:1; x + y = about 30)

(Liquid crystal compound B)

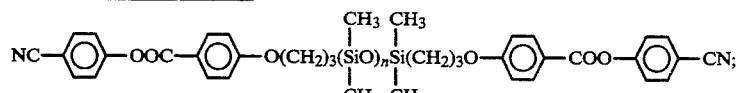

(ii)

(n = about 5)

(Liquid crystal compound C)

-continued
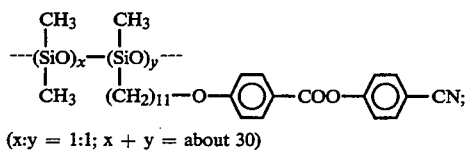 (iii)
(x:y = 1:1; x + y = about 30)
(Liquid crystal compound D)
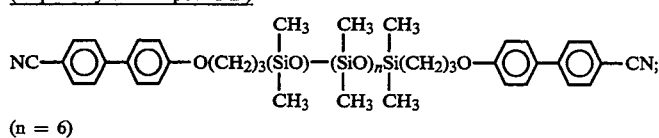 (iv)
(n = 6)
(Liquid crystal compound E)
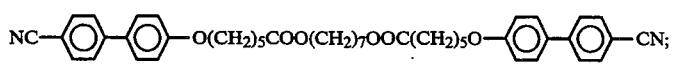 (v)
(Liquid crystal compound F)
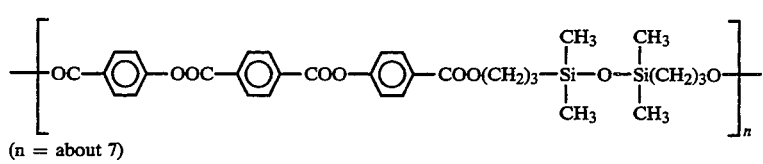 (vi)
(n = about 7)
(Liquid crystal compound G)
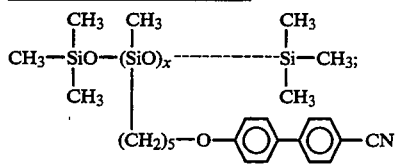 (vii)
(x = 20)
(Liquid crystal compound H)
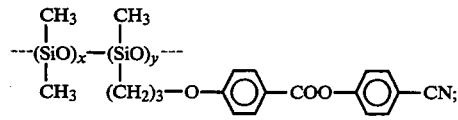 (viii)
(x:y = 2:1; x + y = about 30)
(Liquid crystal compound I)
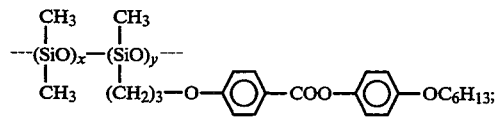 (ix)
(x:y = 2:1; x + y = about 30)
(Liquid crystal compound J)
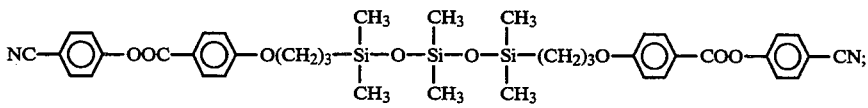 (x)
(Liquid crystal compound K)
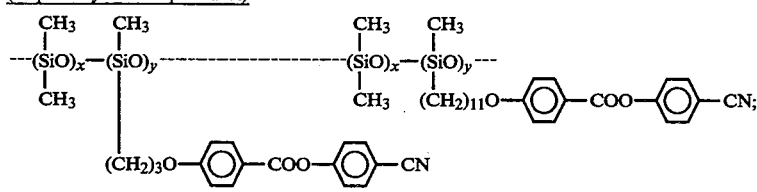 (xi)
(x:y = 2:1; x + y = about 30)
(Liquid crystal compound L)

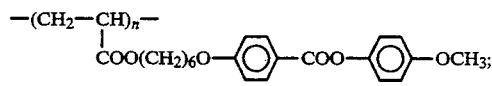 (xii)

(n = 30)

(Liquid crystal compound M)

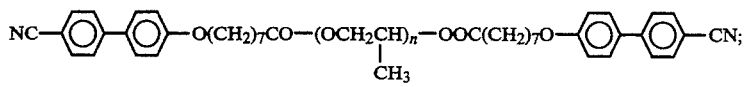 (xiii)

(n = 25)

(Liquid crystal compound N)

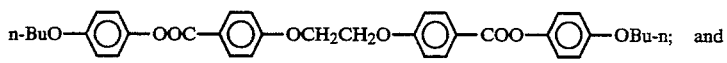 (xiv)

(Liquid crystal compound O)

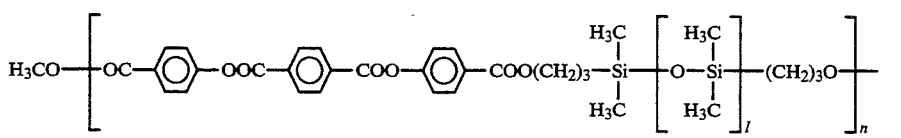 (xv)

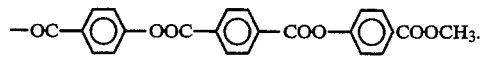

(l = 5; n = about 7)

15. The method of claim 1, wherein said voltage is an alternating voltage or a direct pulsating voltage.

16. The method of claim 1, wherein said shear rate is 100 sec$^{-1}$ or more.

17. In an actuator comprising electrodes and an electrorheological liquid being located between said electrodes, the improvement wherein said electrorheological fluid is a fluid of a liquid crystal compound comprising a molecular chain having at least two liquid crystal groups bonded thereto either directly or via a spacer.

18. A method for changing the viscosity of a homogeneous electrorheological fluid comprising a liquid crystal compound comprising a molecular chain having at least two liquid crystal groups bonded thereto either directly or via a spacer, which comprises application of an alternating voltage or a direct pulsating voltage under a shear rate to said electrorheological fluid.

* * * * *

UNITED STATES PATENT AND TRADEMARK OFFICE
CERTIFICATE OF CORRECTION

PATENT NO. : 5,354,489
DATED : October 11, 1994
INVENTOR(S) : Akio INOUE et al

It is certified that error appears in the above-indentified patent and that said Letters Patent is hereby corrected as shown below:

Claim 13, Column 30, Line 49, "off" should read --of--.

Signed and Sealed this

Eighteenth Day of July, 1995

Attest:

BRUCE LEHMAN

Attesting Officer

Commissioner of Patents and Trademarks